Oct. 4, 1966 S. F. TRUSH 3,277,348
RELAY CIRCUIT
Filed Aug. 2, 1965 2 Sheets-Sheet 1

INVENTOR.
Steven F. Trush
By Warren T. Jessup
Attorney

Oct. 4, 1966 S. F. TRUSH 3,277,348

RELAY CIRCUIT

Filed Aug. 2, 1965 2 Sheets-Sheet 2

INVENTOR.
Steven F. Trush

By Warren T. Jessup
Attorney 3,277,348
RELAY CIRCUIT
Steven F. Trush, P.O. Box K, Morrisville, N.Y.
Filed Aug. 2, 1965, Ser. No. 477,661
20 Claims. (Cl. 317—142)

The present invention relates to relay circuits, and it relates more particularly to an improved relay circuit of the time delay type.

This application is a continuation-in-part of copending application Serial No. 272,630, now abandoned.

The primary object of the invention is to provide an improved electrical circuit for energizing the coil of an electrically energized type of relay, and for providing a desired time delay in the energization of the relay coil.

A further object of the invention is to provide such an improved relay energizing circuit which is eminently simple in its construction and operation, and yet which operates with a high degree of precision.

A further object of the invention is to provide such an improved time delay relay energizing circuit which is capable of providing a wide range of time delays in the energization of the associated relay coil.

The improved time delay relay energizing circuit, in the embodiments to be described, is a transistorized circuit using a unijunction type of transistor. The relay coil is included in circuit with one of the base electrodes of the transistor. The firing of the transistor is controlled in a manner to be described.

A resistance-capacitance time constant network is included in the firing circuit of the unijunction transistor, and the overall time delay relay energizing circuit is constructed so as to obviate excessive loading on the time-constant network by the emitter impedance of the unijunction transistor. Because of this, the circuit of the present invention is capable of satisfactory operation, even when the time delays to be provided by the resistance-capacitance network are extremely long.

The relay energizing circuit to be described is constructed so that when the unijunction transistor is rendered conductive, the discharge current from the capacitor in the time-constant network flows through the relay coil in addition to the inter-base current of the transistor. These additive currents provide for maximum utilization of the available power from the energizing circuit.

The relay energizing circuit also provides a means for adjusting the emitter peak point voltage of the unijunction transistor to compensate for component variables, thereby permitting precise repeatability and calibration from unit-to-unit.

The relay energizing circuit to be described also exhibits improved fast firing characteristics, when the energizing circuit is set to extremely short time delays. This latter capability of the circuit is due to an inherent voltage stabilizing action provided by circuit. This voltage stabilizing action is such that the exciting voltage is held essentially constant, even in the presence of the rapid demand for a high current from the source.

In addition, the improved relay energizing circuit of the invention may be constructed to be adjustable through a wide range of desired time delays, and it may include means for precisely calibrating the time delay adjustment control.

Other objects, advantages, and features of the invention will become apparent from a consideration of the following specification, when the specification is taken in conjunction with the accompanying drawings, in which.

Figure 1:
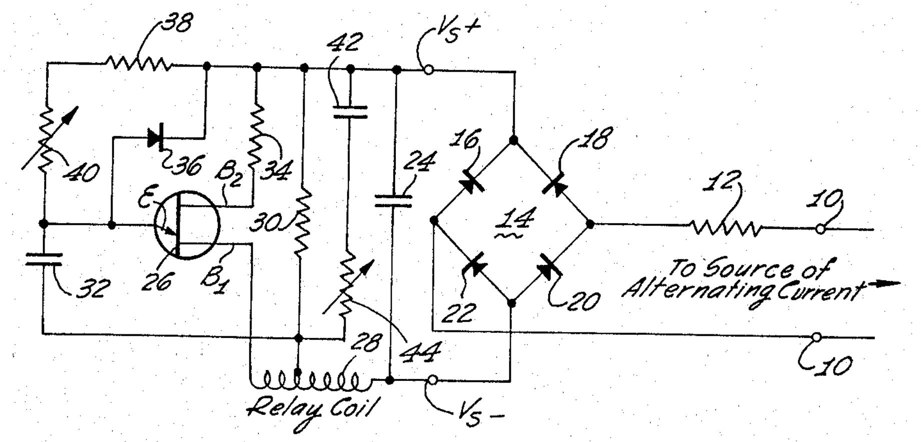
FIGURE 1 is a circuit diagram representative of one embodiment of the time delay relay energizing circuit of the invention.

The relay energizing circuit illustrated in FIGURE 1 includes a pair of terminals 10 which may be connected to any appropriate source of alternating current. These terminals, for example, may be connected to the usual 115-volt alternating-current power lines.

One of the terminals 10 is connected to a resistor 12, and the other is connected to one terminal of a bridge rectifier 14. The resistor 12 is connected to a second terminal of the bridge rectifier. The resistor 12 may have a resistance, for example, of 5600 ohms. The purpose of the resistor 12 is to provide the proper operating voltages for the unijunction transistor used in the circuit of FIGURE 1. The resistor 12 also acts as a surge-limiting resistor.

The bridge rectifier 14 includes a group of diodes 16, 18, 20 and 22 connected in the conventional type of bridge network, as shown. These diodes may be usual miniature silicon rectifiers. The other terminals of the bridge rectifier are connected respectively to a positive lead designated $V_S+$ and to a negative lead designated $V_S-$.

A capacitor 24 is connected across the leads $V_S+$ and $V_S-$, and the capacitor 24 functions as a filter capacitor. The capacitor 24 may, for example, have a capacity of 10 microfarads. The capacity of the capacitor 24 is such that most, but not all, of the second harmonic 120 cycle ripple frequency from the bridge rectifier 14 is removed.

For reasons to be expailned, the value of the capacitor 24 is selected so as to permit some of the second harmonic ripple frequency voltage to remain superimposed on the direct-current voltage across the leads $V_S+$ and $V_S-$. This remaining ripple frequency voltage has a 4–10 volt peak-to-peak value, for example, and its presence is extremely important in adding to the efficiency of the operation of the circuit, as will be explained.

The transistorized cirucit of FIGURE 1 includes a unijunction transistor 26. The unijunction transistor may be of the type designated 2N–1671B, for example. This transistor has three electrodes which are usually referred to as the emitter (E), the first base ($B_1$), and the second base ($B_2$). Between the two base electrodes, the unijunction transistor 26 has characteristics of an ordinary resistance. This resistance is usually referred to as the "inter-base" resistance.

If the emitter voltage of the transistor 26 is less than the emitter peak point voltage, the emitter will be reverse biased and only a small reverse leakage current will flow in the transistor. However, when the emitter voltage is equal to, or greater than, the emitter peak point voltage, the unijunction transistor 26 will be rendered conductive. In the conductive condition of the unijunction transistor, the resistance between the emitter (E) and the first base ($B_1$) is very low, and the emitter current rises to a relatively high value. In addition, the inter-base resistance of the transistor is reduced materially, so that a relatively higher current flows between the base electrodes ($B_1$) and ($B_2$) than when the transistor is in its non-conductive state.

The base electrode ($B_1$) of the transistor 26 is connected through a relay coil 28 to the negative lead $V_S-$. The relay coil 28 may be of the type used in a 115-volt alternating current, 60 cycle, 3.9-volt-ampere relay, for example. This relay may, for example, be of the double pole, double throw type.

The relay coil 28 may exhibit a direct current resistance of the order of 1200 ohms, and it is tapped, as illustrated. The tap is displaced from the transistor end of the relay coil 28 to define a left hand portion of the relay coil in FIGURE 1. This left hand portion has a direct current resistance, for example, of the order of 150 ohms. The tap on the relay coil 28 is connected through a resistor 30 to the positive lead $V_S+$. This tap is also connected to a capacitor 32 which, in turn, is connected to the emitter (E) of the transistor 26. The resistor 30 may have a resistance, for example, of 5600 ohms.

The second base ($B_2$) of the transistor 26 is connected to a resistor 34 which, in turn, is connected to the positive lead $V_S+$. The resistor 34 may, for example, have a resistance of 330 ohms.

The emitter (E) of the transistor 26 is also connected to the anode of the diode 36. The cathode of the diode is connected to the positive $V_S+$.

A pair of resistors 38 and 40 are connected in series between the positive lead $V_S+$ and the emitter (E) of the transistor 26. The resistor 40 is variable. A capacitor 42 and a variable resistor 44 are connected in series across the resistor 30. The capacitor 42 may, for example, have a capacity of 5 microfarads. The resistor 44 may have a resistance, for example, of 2500 ohms.

The capacitor 32, in conjunction with the resistor 38 and resistor 40, forms the aforementioned resistance-capacitance time-constant network, which establishes the time delay in the actuation of the relay-energizing circuit of FIGURE 1. The resistor 40 serves as the time-adjusting resistor, and it may be set to provide any desired time delay through a wide range.

The capacitor 42, in conjunction with the variable resistor 44, provides the adjusting means for the emitter peak point voltage for the unijunction transistor 26.

The resistor 38 serves as a limit resistor. The resistor 38 may, for example, have a resistance of 3300 ohms. The resistor 30 serves as a quiescent current resistor for the relay coil 28.

The diode 36 serves as a discharge diode for the time-constant network. The diode serves to improve the reset time of the time-constant network in that it discharges the capacitor 32 at the low voltage level at which the emitter diode section of the unijunction transistor becomes inoperative. This diode is selected to display a very low forward resistance and a very high back resistance.

If the source voltage ($V_S$) is applied and then removed before the capacitor 32 has reached the emitter peak point voltage of transistor 26, the charge voltage present on the capacitor 32 must be rapidly removed to provide the proper time delay period in the event that the source voltage is again applied.

When the source voltage is removed, the capacitor 32 can discharge through two paths. The first path consists of the resistors 40, 38 and 30. The second path is through the emitter diode section of the transistor 26, and through the left hand portion of the relay coil 28.

The main discharge path is normally through the emitter diode section and left hand portion of the relay coil 28, because that path normally has the lower resistance. However, the emitter diode section of the transistor 26 is effectively blocked at a low voltage level due to the inherent characteristics of the transistor.

Therefore, when the transistor 26 is in its non-conductive state, the capacitor 32 discharges through the resistors 40, 38 and 30. If the resistance value of resistor 40 is large, the discharge time through that path can be relatively long, so that it would be possible for the source voltage to be reapplied before the capacitor 32 has fully discharged.

By the addition of the diode 36, the voltage on the capacitor 32 can be rapidly discharged through the diode 36 and through the resistor 30, so as to obviate the condition referred to above. As mentioned, the diode 36 is preferably of a high conductance type and is selected to display a very low forward resistance and a very high back resistance. When the source voltage is applied, the diode 36 is reversed biased, and it produces essentially no shunting effect on the resistors 40 and 38.

As noted above, the resistor 12 lowers the alternating-current input voltage to the desired operating level, this being achieved before the voltage is rectified by the diodes of the bridge rectifier 14. As also mentioned, the resistor 12 further serves as a surge limiting resistor for protective purposes.

When the alternating-current voltage is first introduced across the terminals 10, two quiescent currents are established through the relay coil 28. These quiescent currents are too small to energize the relay. However, they improve the pull-in response of the relay by reducing the back E.M.F. effects. Moreover, as will be described, the quiescent currents also provide hold-in currents for the relay after the circuit has operated.

The first of these quiescent currents ($I_R$) passes through the right hand portion of the relay coil 28 and through the resistor 30 between the positive and negative leads $V_S+$ and $V_S-$. The second of these quiescent currents ($I_{BB}$) passes through the entire relay coil 28, and through the inter-base resistance of the non-conductive transistor 26 and through the resistor 34.

The transistor 26 is connected essentially as a relaxation oscillator. After the alternating-current from the source has been applied to the input terminals 10 for a predetermined length of time, the resulting rectified voltage across the leads $V_S+$ and $V_S-$ causes the capacitor 32 to be charged through the limit resistor 38 and through the time adjustment resistor 40 to a predetermined level.

The capacitor 32 is charged through the resistors 38 and 40 until the emitter peak point voltage of the unijunction transistor is reached, at which time the transistor 26 is rendered conductive. It will be appreciated that the time at which the emitter peak point voltage is reached can be established as an adjustable time delay, by corresponding adjustments of the variable resistor 40.

Until the time that the emitter peak point voltage is reached, the currents through the relay coil 28 are the quiescent currents described above, and the relay remains deenergized. As mentioned, the time required for the charge across the capacitor 32 to reach the peak point voltage is set by the adjusted value of the variable resistor 40 and the value of the resistor 38.

When the emitter peak point of the unijunction transistor 26 is reached, the transistor is rendered conductive, and a heavy and rapid discharge current from the capacitor 32 flows from the emitter (E) of the transistor to the base ($B_1$), and through the left hand portion of the relay coil 28. In addition, and due to the increase in the interbase current of the transistor 26, an additive current flows through the entire coil. These combined currents flow in a mutual aiding direction, and they result in substantial currents in the relay coil 28, so that the relay is energized and its normally open contacts are closed.

The capacitor 32 discharges rapidly, and after it has discharged to the emitter valley voltage level, the transistor 26 returns to its emitter-reversed bias state. The flow of discharge current through the relay coil 28 is then terminated. However, the aforementioned quiescent currents in the relay coil, as mentioned above, are sufficient to maintain the relay in its energized pulled-in condition.

The value of the capacitor 24 is chosen, such that a second harmonic ripple voltage appears super-imposed on the direct-current voltage level, as mentioned above. This ripple voltage appears at the terminals of the relay coil 28, and at the intermediate tap on the coil. Due to the ripple voltage, the potential at the base electrode ($B_1$) of the transistor 26, instead of being at a steady level, increases and decreases at the frequency of the ripple voltage. Due to the transformer action within the relay coil 28, the increase and decrease of the voltage at the base ($B_1$) is 180° out of phase with the voltage at the tap of the relay coil 28 and at the lower side of the capacitor 32.

Therefore, as the charge voltage across the capacitor 32 approaches the firing voltage of the unijunction transistor 26, the peak of a negative cycle of the second harmonic ripple voltage appearing at the base electrode ($B_1$) of the transistor in effect momentarily lowers the firing level by lowering the voltage across the base electrodes, and the transistor fires. As a result, the firing current for the transistor 26 is supplied from the capacitor 32, rather than from the resistors 38 and 40. This is because the voltage across the capacitor 32 is, at the moment of firing, at a higher voltage level than the voltage supplied from the resistor 40.

Therefore, at the moment of firing of the transistor 26, the emitter circuit of the transistor does not produce a loading effect on the time-constant network, so that the limiting factor of the resistance-capacitance time-constant network is the leakage factor of the capacitor 32, rather than the values of the resistors 38 and 40. It follows that these resistors may have an extremely large combined value, so as to provide an extremely long delay for the system, when such a long time delay is required, and without adversely affecting the operation of the system.

Capacitor 42 and resistor 44 adjust the magnitude of the ripple voltage appearing at the base electrode ($B_1$) of the transistor 26 by controlling the amount of alternating-current flow through the right hand portion of the relay coil 28. As the alternating-current is increased, by decreasing the resistance of the variable resistor 44, the ripple voltage increases at the base electrode ($B_1$) through the transformer action of the relay coil 28.

Figure 2:
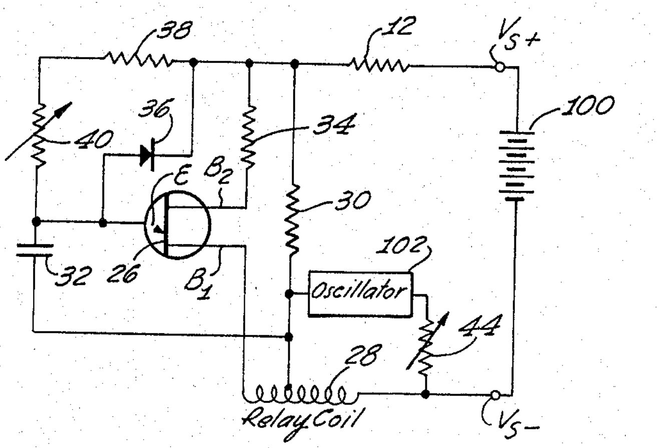
FIGURE 2 is a circuit diagram of a second embodiment of the invention.

The circuit of FIGURE 2 is generally similar to that of FIGURE 1, and like components have been designated by the same numbers. However, in the latter embodiment, the voltage across the leads $V_S+$ and $V_S-$ is supplied by a direct-current voltage source, such as a battery 100. In the latter embodiment, the desired ripple voltage may be supplied by an oscillator 102, whose output terminals are connected to the right hand terminal of the relay coil 28 and to the intermediate tap, as shown.

The oscillator 102 may be any desired type of circuit, and, for that reason, its circuit details are not shown. The oscillator supplies an oscillating signal of, for example, 60 to 120 cycles of low magnitude voltage, and of proper polarity.

The ircuit of FIGURE 2 operates in the same manner as that described above in the operation of the circuit of FIGURE 1.

Figure 3:
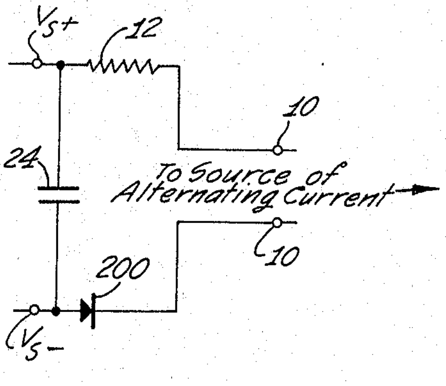
FIGURE 3 is a fragmentary circuit diagram illustrating the manner in which the circuit of FIGURE 1 may be simplified.

Further simplifiaction is in the circuit of FIGURE 1 may be achieved, in the manner shown in the fragmentary diagram of FIGURE 3. In FIGURE 3, the rectification of the current from the alternating-current source is achieved by means of a half-wave rectifier diode 200, rather than the bridge rectifier 14 of the circuit of FIGURE 1. The diode rectifier 200 can be connected in either input line, when its polarity is properly selected. The value of the resistor 12 is then adjusted to provide the proper voltage across the leads $V_S+$ and $V_S-$.

As mentioned above, the disclosed energizing circuits of the invention are also advantageous in that they provide stabilization for the exciting voltage $V_S$. This adds to the flexibility of the circuit, in that it is capable of providing a fast energization for the relay coil 28, when so desired.

When the unijunction transistor 26 is first fired, the inter-base resistance rapidly drops to an extremely low value. This low value of the inter-base resistance rapidly increases the current demand of the circuit, which has a tendency to reduce the supply voltage across the leads $V_S+$ and $V_S-$. However, in the circuit of the invention, at the same moment that the current demand increases rapidly, a corresponding increase in voltage occurs across the portion of the relay coil 28 between the tap and the left hand terminal of the coil. This voltage increase across the aforesaid portion of the relay coil 28 is due to the increased flow of discharge current from the capacitor 32 through the emitter (E) to base ($B_1$) portion of the transistor 26 when the transistor is fired, and because of the correspondingly increased inter-base current in the transistor, as mentioned above.

The above-mentioned rapid change of voltage across the left hand portion of the relay coil 28 also appears across the right hand portion of the coil because of the transformer action in the coil. The favorable turns ratio between the two portions of the relay coil causes the voltage to appear across the right hand portion of the relay coil with increased amplitude. The voltage appearing at the right hand portion of the relay coil has a polarity to counteract the tendecy for the voltage across the leads $V_S+$ and $V_S-$ to fall during the firing portion of the cycle of the circuit.

The above described voltage regulation effect of the circuit of the invention considerably improves the fast time cycles in the range of .1–.5 second, where the average current requirement becomes increasingly higher with the faster time periods. Low input voltage firing characteristics for the circuit are also improved by virtue of the same action.

In a constructed embodiment of the invention, delay periods of 0.1 second (resistor 40 set to zero) to over 6½ hours (resistor 40 set to approximately 400 megohms) have been achived in the circuits described above. The maximum time delay for the circuits has been found to be limited only by the physical size of the resistors and capacitors which can be used in the time-constant network.

Figure 4:
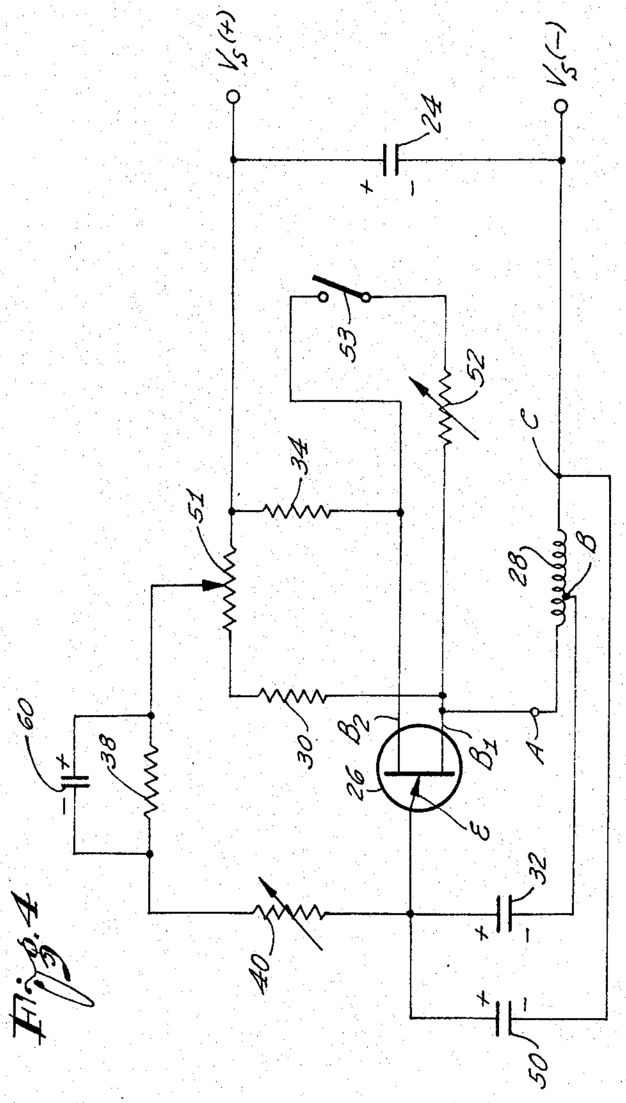
FIGURE 4 is a circuit diagram of a third embodiment of the invention.

It will be observed that the embodiment of the invention shown in FIGURE 4 is essentially similar to that shown in FIGURE 1. However, certain changes have been made in the latter circuit.

For example, the capacitor 42 and resistor 44 of the circuit of FIGURE 1 have been removed from the circuit of FIGURE 4. This deletion is made from the circuit of FIGURE 4 because of the possibility of contact chatter in the relay at the setting of the resistor 44 for maximum ripple voltage. The ripple voltage is established at a fixed value in the circuit of FIGURE 4.

In addition, the diode 36 of the circuit of FIGURE 1 is removed from the circuit of FIGURE 4. This removal is due to the present-day unavailability of suitable diode with the required low forward resistance. Instead, this diode is replaced by an improved capacitor discharge technique, as will be described.

In the circuit of FIGURE 4, the resistor 30 is connected to the left hand terminal A of the relay coil 28, rather than to the tap B, as was the case in the circuit of FIGURE 1. The aforesaid change in the connection of the resistor 30 causes a quiescent current to flow through the entire relay coil 28, instead of through a portion. This enables a desired level of magnetic flux to be established in the relay at a lower D.C. current through the coil 28. This change in the connection of the resistor 30 also results in improved relay response when the firing voltage is applied across the leads $V_S+$ and $V_S-$.

In addition, the connection of the resistor 30 in the circuit of FIGURE 4 forms a shunt path across the inter-electrode resistance ($R_{BB}$) of the unijunction transistor 26. This minimizes any unfavorable effects due to variations in this parameter from one transistor to the next during production of units incorporating the circuits.

In the circuit of FIGURE 4, a direct-current type of relay is used, without any residual gap between the armature and pole piece, in place of the alternating-current relay mentioned above. The direct-current relay which is used in the circuit of FIGURE 4 may be basically the same as the alternating-current relay suggested above, except for the absence of the usual shorted turn on the pole piece of the alternating-current relay. The elimination of the shorted turn on the pole piece shortens relay pull-in and drop-out time, resulting in faster relay action.

The elimination of the residual gap provides increased holding power after relay pull-in for an equivalent relay coil current.

The residual gap on the usual type of direct-current relay is used to prevent a residual magnetism build-up in the pole piece which might result in relay sticking. However, this is not a problem in the present circuit, because of the aforesaid second harmonic alternating-current ripple voltage component which is present on the basic direct-current supply voltage. Therefore, there is no need to provide any such residual gap in the relay.

In the circuit of FIGURE 4, a capacitor 50, having a capacitance, for example, of 4 microfarads, is connected from the emitter (E) of the transistor 26 to the right hand terminal C of the relay coil 28 which is the negative lead ($V_S$−).

As mentioned above, it is important that if the relay circuit is operated and the power removed, capacitor 32 may be discharged as rapidly as possible. This rapid discharge was effectuated by the diode 36 in the circuit of FIGURE 1. In the circuit of FIGURE 4, the same effect is realized by the capacitor 50. The capacitors 32 and 50 are connected essentially in parallel through the right hand portion of the relay 28.

However, the voltage at the right hand connection C of the relay 28 is at a more negative value than the voltage appearing at the tap (B). Because of this, the voltage across the capacitor 50 is of a greater magnitude, but has a negative component in respect to a voltage across the capacitor 32. When voltage is applied to the circuit, this negative component appears as a negative pulse across the capacitor 32 thereby substantially reducing the residual voltage of the capacitor 32 towards zero, as is desired.

In addition, a potentiometer 51 is added in the circuit of FIGURE 4 between the resistors 30 and 34. The movable arm of the potentiometer 51 is connected to the resistor 38. The potentiometer 51 may have a resistance, for example, of 1000 ohms. The potentiometer 51 provides a means for adjusting the magnitude of the charging voltage on capacitors 32 and 50, so as to provide a means for calibrating the dial setting of the timing range variable resistor 40.

In the circuit of FIGURE 4 the base $B_1$ of the transistor 26 is connected through a variable resistor 52 and through auxiliary contacts 53 of the relay to the base $B_2$. This connection provides a means for rapidly discharging the capacitor 24 when power is removed from the circuit. This discharge path is through resistor 34, the relay contacts 53, resistor 52 and coil 28 of the relay. Discharging capacitor 24 in this manner allows the relay to drop out more rapidly thereby permitting faster recycle of the circuit. Repeat accuracy is also improved by minimizing or eliminating any circuit residual voltage from capacitor 24 after power removal. Auxiliary contacts 53 are normally open. They close when relay 28 is energized, pulls in, and holds. Additional contacts on relay 28 are of the double pole double throw (DPDT) variety and are used for controlling external circuitry.

The auxiliary contacts 53 also provide a means for minimizing the "cold-to-hot" characteristic shift of the transistor 26. This shift causes time period variances between circuit cycles with 1–30 second "off" periods. Resistor 52 permits a limited adjustment of current through the relay with contacts 53 closed. This adjustment controls the amount of back electromotive force available from the relay coil 28 which is applied across the capacitor 32 as a negative bias voltage through the $B_1$–E diode section of the transistor 26.

Because the back electromotive force from the relay is of a low magnitude, the lowest forward conducting resistance of the aforesaid diode section is highly desirable so that a consistent adjusted value of back electromotive force appears across the capacitor 32.

Connecting the base $B_1$ of the transistor 26 to the base $B_2$ by means of the contacts 53 reduces and stabilizes the forward conducting resistance of the aforesaid diode section by a factor of up to five.

The negative bias voltage can be adjusted by resistor 52 to a value which minimizes the junction heating effect of transistor 26. Heating of the transistor junction causes the time period to increase and usually occurs within the first 30 seconds after power is applied to the circuit.

A capacitor 60, having a capacity of 5 microfarads, for example, is shunted across the resistor 38. In certain applications, such as when the circuit of FIGURE 4 is used with a regulated direct-current source voltage, the capacitor 60 may be connected, for example, between the junction of the capacitors 32 and 50, and the junction of the potentiometer 51 and resistor 34.

The capacitor 60 serves to improve fast time cycles in the range of .25–.10 second at below normal input voltages.

When the value of the variable resistor 40 is adjusted to the fast time periods of .25–0.1 second, the average current requirement of the unijunction transistor 26 increases rapidly. As a result, the voltage at the base $B_2$ and at the base $B_1$ is lowered considerably because of the IR drop characteristic of the circuit, and negligible regulation of the source voltage ($V_S$).

To aid the inherent regulation of the circuit, the capacitor 60 provides additional energizing current through the relay 28. By virtue of the connection of the capacitor 60, its charging current is additive with the discharge currents from the capacitors 32 and 50 as the unijunction transistor 26 fires.

The capacitor 60 becomes increasingly effective as the resistance of the resistor 40 is decreased to be in the 0–1000 ohm range of settings. Therefore, the low voltage characteristic of the 0.25–0.10 second operating range is elevated to correspond with the performance available at the longer period settings.

The capacitor 60 has been found to extend the low voltage performance during the shorter period settings of the system by at least 10% below the pervious lowest operating voltage.

This enables the operating voltage tolerances of the circuit of FIGURE 4 to be stated as −30% to +20% of nominal, for example.

The variable resistor 52 permits a limited adjustment of current through the relay coil 28. This adjustment is adequate to control the amount of back E.M.F. available from the relay coil 28 which is applied as a negative bias on the capacitor 32 through the diode section of the emitter (E) and the first base ($B_1$) of the transistor 26. This negative bias voltage can be adjusted by the resistor 52 to a magnitude which minimizes the junction heating effect of the transistor 26. Heating of the transistor junction causes the time period to increase and usually occurs within the first thirty seconds after power is applied to the circuit.

The potentiometer 51, as noted, provides a means for calibrating the dial setting of the time range resistor 40. This is required for standardization of time periods on production units. Large variation in characteristics and values of capacitors, transistors and other components used in the manufacture of the equipment makes it necessary to provide a means for achieving such a standardization.

As wide an adjustment as possible without affecting circuitry performance is desirable. Potentiometer 51 for example, provides an adjustment range of at least 60% of the time period setting of resistor 40. This is accomplished in the following manner.

Since potentiometer 51 is installed in the circuit as a voltage divider, an adjustable voltage is available at its adjustable arm. This adjustable voltage is applied to the capacitors 32 and 50 through the resistors 38 and 40.

The resultant effects are that the lower the charging voltage, the longer the time period, and the higher the charging voltage the shorter the time period. Time period resistor 40 can now be set, for example, to its maximum time period and potentiometer 51 adjusts it (over a 60% range) to calibrate this setting to a specific dial reading.

No change in the firing voltage point of the unijunction transistor 26 occurs over the entire adjustment range of the potentiometer 51. This is because the voltage of the base electrode ($B_2$) of the transistor 26 remains unchanged during any adjustment of the potentiometer 51.

The circuits of the invention are extremely flexible in that they can operate through a wide range of alternating current input voltages, merely by changing the value of resistor 12. Also, the circuit will tolerate a variation in input voltage of the order of −30% to +20% without affecting its timing characteristic in any appreciable manner.

The voltage regulation of the circuit is such that the voltage has been found to return to its pre-firing level approximately 200% faster than similar circuits constructed in accordance with usual prior art techniques. A constructed embodiment of the invention consumes 2 watts at 120-volts, 60 cycle alternating-current supply.

The invention provides, therefore, an improved relay energizing circuit which is advantageous in that maximum utilization is made of the available power in the circuit. This maximum utilization is achieved by the use, for example, of the additive currents in the relay coil as described above.

An important feature of the invention is the superimposition of the second harmonic ripple voltage on the direct-current exciting potential. This ripple voltage, as described above, serves virtually to eliminate any loading on the timing circuit. The resulting system has permitted time periods to be extended significantly beyond the limits of the usual transistorized prior art time delay circuits.

In addition, fast timing characteristics of the system of the invention are improved by the voltage stabilizing action of the relay coil, as described above. This stabilizing action also improves the low input voltage firing characteristic of the system.

The improved system described above also serves to provide quiescent currents in the relay coil to improve the response time of the relay, and also to provide a satisfactory hold-in current after the relay has been energized. Removal of the residual gap as customarily used in D.C. relays provides relay hold-in at a much lower coil current than would be required if the gap were present.

In addition, improved circuitry has been described which permits the system rapidly to achieve its normal condition after reapplication of the energizing voltage. Moreover, calibration means have been provided so that time delays may acccurately be calibrated in production units.

The improved relay energizing circuits of the invention are eminently simple in their construction, and they do not require any special components. The circuitry of the invention is most advantageous in that it operates with a high degree of efficiency to perform its intended purpose, and because it is capable of providing time delays extending through an extremely wide range.

While particular embodiments of the invention have been shown and described, modifications may be made, and it is intended in the claims to cover such modifications which fall within the spirit and scope of the invention.

What is claimed is:

1. A relay energizing circuit including:

a unijunction transistor having an emitter electrode, a first base electrode and a second base electrode;

an exciting circuit for introducing a unidirectional potential to said transistor and having a first terminal and a second terminal;

means including a relay coil connecting said first base electrode of said transistor to said first terminal of said exciting circuit;

means connecting said second base electrode to said second terminal of said exciting circuit;

resistance means connected to said second terminal of said exciting circuit and to a tap on said relay coil;

and a time-constant network including, further resistance means connected to said emitter electrode of said transistor and to said second terminal of said exciting circuit, and capacitance means connected to said emitter and to said tap on said relay coil.

2. The relay energizing circuit of claim 1 and which includes means for causing an alternating-current ripple voltage to be superimposed on said unidirectional potential.

3. The relay energizing circuit of claim 1 and which includes diode means connected between said emitter electrode and said second terminal for producing a discharge path for said capacitor means.

4. The relay energizing circuit defined in claim 1 in which said exciting circuit includes input terminal means adapted to be connected to an alternating-current source, rectifier means for transforming the alternating-current voltage from said source into a unidirectional potential, and capacitor means for partially filtering the unidirectional potential from said rectifier means so as to produce an alternating-current ripple voltage superimposed on said unidirectional potential.

5. The relay energizing circuit defined in claim 1 in which said exciting circuit includes input terminal means adapted to be connected to an alternating-current source, rectifier means for transforming the alternating-current voltage from said source into a unidirectional potential, series resistance means for establishing the value of said unidirectional potential and for protecting said transistor from surge voltages; and shunt-connected capacitor means for partially filtering the unidirectional potential from said rectifier means so as to produce an alternating-current ripple voltage superimposed on said unidirectional potential.

6. The relay energizing circuit defined in claim 1 in which said exciting circuit includes input terminal means adapted to be connected to an alternating-current source, bridge rectifier means for transforming the alternating-current votlage from said source into a unidirectional potential; and capacitor means for partially filtering the unidirectional potential from said rectifier means so as to produce an alternating-current ripple voltage on said unidirectional potential.

7. The relay energizing circuit defined in claim 1 in which said exciting circuit includes input terminal means adapted to be connected to an alternating-current source, series-connected diode rectifier means for transforming the alternating-current voltage from said source into a unidirectional potential; and capacitor means for partially filtering the unidirectional potential from said rectifier means to produce an alternating-current ripple voltage on said unidirectional potential.

8. The relay energizing circuit defined in claim 1 and which includes oscillator means coupled to said transistor for superimposing an alternating-current ripple voltage on said unidirectional potential.

9. The relay energizing circuit defined in claim 1 and which includes series-connected capacitor means and variable resistor means connected in shunt with said second resistance means.

10. A relay energizing circuit including:

a unijunction transistor having an emitter electrode, a first base electrode and a second base electrode;

an exciting circuit for introducing a unidirectional potential to said unijunction transistor and having a first terminal and a second terminal;

means including a relay coil connecting said first base electrode of said transistor to said first terminal of said exciting circuit;

means connecting said second base electrode to said second terminal of said exciting circuit; and a time-constant network including resistance means connected to said emitter electrode of said transistor and to said second terminal of said exciting circuit, and further including capacitance means connected to said emitter electrode and to a tap on said relay coil.

11. The relay energizing circuit defined in claim 10 and which includes potentiometer means connected to said first base electrode and to said second terminal of said exciting circuit and including a movable arm connected to said resistance means in said time-constant network to control the voltage applied to said time-constant network.

12. The relay energizing circuit defined in claim 10 and which includes capacitor means connected between said emitter electrode and said first terminal of said exciting circuit for effectively producing a discharge means for said first-mentioned capacitor means.

13. The relay energizing circuit defined in claim 10 and which includes further capacitor means connected across said first and second terminals of said exciting circuit, resistance means and relay contacts connected between said first base electrode of said transistor and said second base electrode of said transistor for providing a discharge path for said last-named capacitor means and to provide a supplementary holding circuit for the relay, and further to minimize junction heating effects in said transistor.

14. The relay energizing circuit defined in claim 10 in which includes capacitor means connected in shunt with first resistor and variable resistor, and which includes capacitor means connected in shunt with said first resistor.

15. The relay energizing circuit defined in claim 10 and which includes capacitor means connected in shunt with at least a portion of said resistance means.

16. A relay energizing circuit including:

an electronic discharge device having first and second electrodes, and further having a third electrode for controlling the discharge current in said device between said first and second electrodes;

said device exhibiting a relatively high discharge current flow between said first and second electrodes, and between said third and first electrodes when the potential on said third electrode exceeds a predetermined threshold;

a relay energizing coil having an intermediate tap and connected in circuit with said first electrode of said device to be energized upon the flow of discharge current through said discharge device;

an exciting circuit connected to said second electrode of said electronic discharge device and to said relay coil for introducing a unidirectional exciting voltage to said discharge device;

means including first resistance means connected between a terminal of said exciting circuit and said first electrode of said discharge device for establishing a quiescent current in said relay coil; and a resistance-capacitance, time-constant network connected to said exciting circuit for controlling the discharge of said electronic discharge device, said time-constant network including resistance means connected to said third electrode and capacitance means connected to said third electrode and to said tap on said relay energizing coil.

17. The relay energizing circuit defined in claim 16 and which includes third resistance means connecting said time-constant network to a manually adjustable tap on said first resistance means.

18. The relay energizing circuit defined in claim 16 in which said exciting circuit includes input terminal means adapted to be connected to an alternating-current source;

rectifier means for transforming the alternating-current voltage from said source into a unidirectional potential; and capacitor means for partially filtering the unidirectional potential from said rectifier means to produce an alternating-current ripple voltage on said unidirectional potential.

19. The relay energizing circuit defined in claim 16 and which includes oscillator means coupled to said relay energizing coil for superimposing an alternating-current ripple voltage on said unidirectional potential.

20. The relay energizing circuit defined in claim 16 in which said electronic discharge device is a unijunction transistor.

References Cited by the Examiner

UNITED STATES PATENTS

| | | | |
|---|---|---|---|
| 2,867,754 | 1/1959 | O'Blenese | 317—142 |
| 3,084,311 | 4/1963 | Culbertson. | |
| 3,099,758 | 7/1963 | Pieczynski. | |
| 3,109,964 | 11/1963 | Winchel. | |
| 3,154,725 | 10/1964 | Kahah | 317—142 |
| 3,178,619 | 4/1965 | Winchel. | |

MILTON O. HIRSHFIELD, *Primary Examiner.*

SAMUEL BERNSTEIN, STEPHEN W. CAPELLI, *Examiners.*

L. T. HIX, *Assistant Examiner.*